Jan. 23, 1968  K. C. JONES  3,365,596

CONTROL APPARATUS

Filed June 21, 1965

INVENTOR.
KEITH C. JONES
BY
ATTORNEY

United States Patent Office 3,365,596
Patented Jan. 23, 1968

3,365,596
CONTROL APPARATUS
Keith C. Jones, Roseville, Minn., assignor to Honeywell Inc., Minneapolis, Minn., a corporation of Delaware
Filed June 21, 1965, Ser. No. 465,581
8 Claims. (Cl. 310—66)

This invention pertains to control apparatus for providing stabilization torques by means of reaction wheels or control moment gyros to vehicles such as satellite bodies for attitude control thereof. Systems which include automatic attitude change sensing devices may provide stabilizing torques for the vehicle attitude control by use of either control moment gyros or reaction wheels. For such stabilization and orientation of space vehicles the reaction wheel and the control moment gyro requiring high angular momentum have some desirable features from a system standpoint but have some serious shortcomings as devices.

Since the control moment gyro has to continuously sustain a high angular momentum at low power cost, it is necessary to either "trade off" an increase in inertia of the gyro rotor at a cost or penalty in dead weight and space therein or an increase in angular velocity or penalty at a cost in the power for overcoming bearing friction and windage losses of the rotor. The same is true with respect to reaction wheels. Attitude control by reaction wheels is not new herein since it has been reviewed in U.S. Patent 3,105,657 to Mueller et al.

Concerning bearing friction drag this generally increases at slightly more than the first power of speed, and windage drag can increase at better than the second power of speed.

An object of this invention is to provide improved means for reducing bearing friction and windage losses in a device for providing stabilization torques for a vehicle.

A further object of this invention is to provide a novel bearing support for a rotating wheel for reducing the bearing losses and windage losses due to rotation of the wheel.

A further object of this invention is to provide a stacked bearing arrangement involving the staging of one or more light weight containers for reducing bearing and friction losses in a rotating member thereby increasing bearing life.

It is therefore an object of this invention to provide an improved stabilizing element for a satellite vehicle which element may operate in a case without it being evacuated and yet reduce friction losses.

Figure 1:
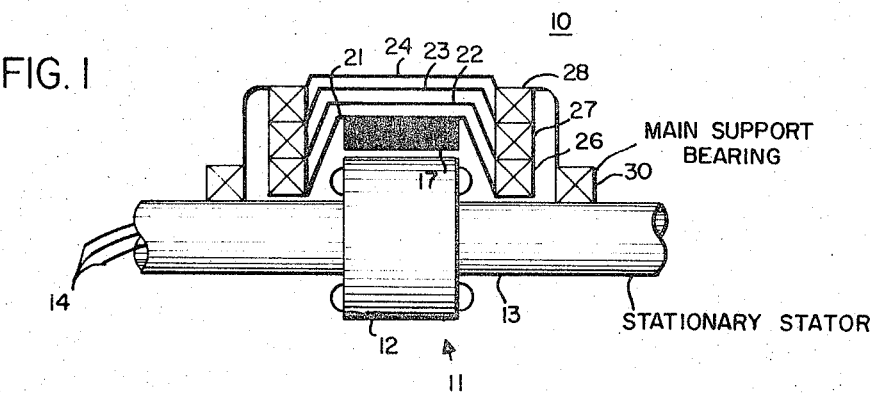
Figure 2:
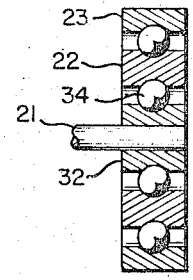

Other objects of the invention will become apparent from the following description taken in connection with the subjoined drawings, in which:

FIGURE 1 illustrates the novel bearing support arrangement between a drive and driven member; and FIGURE 2 illustrates one arrangement of providing stacked bearings in a device for providing stabilizing torques.

On the assumption that the power source for energizing the reaction wheel device for providing stabilization torques to a vehicle is electric current from solar cells, an electric drive is considered below. For optimum efficiencies through a wide range of speeds and torques either a variable frequency source would be necessary on an induction type motor or a variable voltage DC source on a DC motor.

Without further consideration of the driving means for the wheel, the novel arrangement for reducing bearing and windage losses are primarily considered herein. One way that bearing and windage drag, between a rotating member and its associated relatively fixed member due to the fact that it has rotational speed, might be reduced at the higher speeds, would be to stage several lightweight containers in progressively increasing diameters with their own bearings about the outside of the rotor, considering the rotor is driven from a stationary stator mounted within the rotor. Thus, rotation of the rotor as by motor action upon energization of the stator provides reaction torques for stabilizing the attitude of the vehicle about an axis, see for example the patent to Roberson et al. 3,048,108 of Aug. 7, 1962, with respect to the reaction wheel therein. By means of one or more of the above bearing stages, upon energization of the stator and the consequent rotation of the rotor the container or casing adjacent the rotor will also be caused to rotate due to the drag torque thereon resulting from the bearing and windage friction effects. Because of such rotation of the container or casing adjacent thereto, the rotor will thus "see" a relatively low velocity since as stated this container and the bearing mounts should be spinning or rotating but at a reduced velocity compared with the rotor velocity. In other words, because of the apparent lower velocity between the rotor and its bearing supports in the container bearing, friction and windage loss becomes less. The relative drag torque between the staged or stacked containers would cause a velocity gradient between them, if more than one container were used, thus avoiding the extreme velocity losses and bearing stresses otherwise occurring between a rotating member and its fixed support.

Referring now to FIGURE 1, a device 10 for providing stabilizing torques consists of a stator member 11 having a suitable stator portion 12 thereof connected through suitable leads 14 to an AC supply. Exterior of the portion 12 is a rotor or field 17. Exterior of the field 17 are a plurality of staged lightweight containers 21, 22, 23, and 24. The rotor 17 may be mounted within the interior container 21.

A bearing arrangement 26 is provided between the inner casing 21 and the adjacent casing 22; a bearing arrangement 27 is provided between the casing 22 and its adjacent casing 23; and similarly a bearing arrangement 28 is provided between the casing 23 and the outer casing or container 24. Finally a main support bearing 30 is provided between the outer casing 24 and the stationary stator spindle 13. The increase in diameter of the outer casing bearing over the innermost bearing is actually slight.

A similar arrangement is provided for the opposite end of the casings or containers 21, 22, 23, and 24. The mass of the casings is negligible compared to the mass of stator 11.

As shown in FIGURE 2 with the sizes of the bearings and races somewhat enlarged one manner of providing such bearing arrangement between an inner and its adjacent outer container is by securing a bearing race 32 to the inner container 21 shown distorted and securing a bearing race to the next outer container 22 with the space between the two races accommodating ball or roller members 34. For the intermediate containers 22, 23, the races respectively secured thereto may be utilized for the bearing arrangements between the two adjacent casings or containers.

Returning to FIGURE 1, it will be evident that the outer lightweight container 24 is rotatably supported through the main support bearing 30 on the fixed spindle 13 of the stator 11. The inner containers 23, 22, and 21 are in turn supported by the adjacent outer container and serve in turn as a supporting means for the adjacent inner container with the inner container 21 in turn supporting the rotor winding 17 to provide the aforementioned staging. Consequently, as the stator 11 is energized through leads 14, the rotor 17 by motor action in turn begins to rotate carrying with it its container 21. Due to bearing and windage drag effects, the casings 22, 23, and 24 in turn rotate in the same direction as that of the inner container 21. The rotation of container 24 is caused by bearings and windage friction by rotation of container 21, although at a slower rate. The relative velocity between the container 21 and container 22, because of such rotation, is decreased, and with this decrease in relative peripheral velocity between the rotating member 21 and its supporting means 22 less bearing and windage friction losses occur than would exist if container 21 were directly mounted on support bearing 30.

It will now be apparent that I have provided a novel bearing support between two relatively rotatable members wherein a support member is arranged between one member and the member rotating relative thereto with the support member being rotatably supported by the fixed member and in turn rotatably supporting the rotating member.

While modifications and variations of the present invention are possible in the light of the above disclosure, it is therefore to be understood that within the scope of the appended claims, the invention may be practiced otherwise than as specifically described.

What is claimed is:

1. In an electric motor, an arrangement for reducing bearing friction and windage losses comprising an inner, stationary, motor stator:
    a plurality of outer casings of different diameters, all circumferentially enclosing said stator, one casing directed supported on the rotor of said motor; and
    bearing means between said casings of slightly increasing diameter and said one casing, whereby on energization of the stator resulting in rotation of the innermost casing of said plurality of casings by motor action, the remaining casings and casing also rotate due to bearing and windage friction between adjacent casings, so that the relative peripheral velocity of the parts of the bearing means between the rotating and fixed parts of the motor is reduced.

2. In an electric motor driven wheel for providing stabilizing torques for attitude control of a craft, an arrangement for reducing friction losses therein, comprising:
    an inner, stationary motor stator;
    a plurality of concentric casings circumferentially enclosing said stator and supported on the motor stator;
    bearing races secured to the respective casings and bearing races being between the outermost casing and the motor stator; and
    bearing members arranged between said bearing races, whereby relative rotation between the stator and innercasing, as by electric motor action, results in rotation of the remaining outer casings relative to the stator thereby reducing the relative rotational speed of the rotor casing inner-race relative to its supporting outer-race to reduce friction.

3. In a rotatable power means for providing stabilizing torques for attitude control of a vehicle, an inner fixed member:
    a plurality of nested coaxial casings of slightly different diameters circumferentially enclosing said fixed member;
    bearing means between adjacent casings to permit relative rotation thereof;
    means for initiating relative rotation of the fixed member and inner casing resulting, by friction, in rotation of the plurality of casings including relative rotation of the innermost casing and its supporting casing and thus reduction in friction loss in the bearing means of the innermost casing; and
    further means providing a bearing means between the outer most casing and the fixed member.

4. A bearing support for reducing friction such as in a bearing between two relative rotatable members, one circumferentially enclosing the other, comprising:
    a plurality of rotatable elements coaxial mounted between with said members;
    bearing means between said rotatable elements and between one relatively movable member and an element; and
    bearing means directly between the two relatively rotatable members whereby to support said members for relative rotation and whereby to reduce the relative rotational speed between one of said two relatively rotatable members and one of the coaxial circular elements.

5. A bearing support for an electric motor for reducing bearing and/or windage friction losses between two relatively rotatable members of said motor, one circumferentially enclosing the other, comprising:
    a plurality of elements coaxial with two relatively rotatable members;
    bearing means arranged between said coaxial elements, bearing means between one of said member and an adjacent one of said elements; and
    bearing means directly between the two relatively movable members, whereby upon energization of said electric motor causing relative rotation of one of said two members the relative velocity in the parts of the bearing means between one member and one coaxial circular element is more than the relative rotational velocity between the two members.

6. In an electric motor, a bearing support for reducing friction between two coaxial relatively rotatable members, as between a stator and rotor:
    a plurality of circular elements coaxial and mounted between said two members;
    a bearing means between one of said two coaxial relatively movable members and one of the coaxial circular elements; and
    a bearing means directly between the said two relatively movable members and between the coaxial circular elements.

7. In an electric motor, bearing support means for reducing bearing and/or windage friction upon relative rotation of the stator and rotor of the motor comprising:
    casing means circumferentially enclosing the stator and rotor;
    bearings means directly between the casing means and stator;
    bearing means between the casing means and rotor to permit relative rotation of the casing means relative to both the stator and rotor to distribute the relative speed between the rotor and stator.

8. The apparatus of claim 7 wherein the rotor circumferentially encloses the stator.

References Cited
UNITED STATES PATENTS 1,804,600   5/1931   Edson _____ 308—183

MARTIN P. SCHWADRON, *Primary Examiner.*

FRANK SUSKO, *Examiner.*